United States Patent
Chow et al.

(10) Patent No.: US 7,930,531 B2
(45) Date of Patent: Apr. 19, 2011

(54) MULTI-PARTITION USB DEVICE THAT RE-BOOTS A PC TO AN ALTERNATE OPERATING SYSTEM FOR VIRUS RECOVERY

(75) Inventors: David Q. Chow, San Jose, CA (US);
Charles C. Lee, Cupertino, CA (US);
Frank Yu, Palo Alto, CA (US); Tzu-Yih Chu, San Jose, CA (US); Ming-Shiang Shen, Taipei Hsien (TW)

(73) Assignee: Super Talent Electronics, Inc., San Jose, CA (US)

(*) Notice: Subject to any disclaimer, the term of this patent is extended or adjusted under 35 U.S.C. 154(b) by 918 days.

(21) Appl. No.: 11/838,192

(22) Filed: Aug. 13, 2007

(65) Prior Publication Data
US 2008/0052507 A1 Feb. 28, 2008

Related U.S. Application Data (63) Continuation-in-part of application No. 09/478,720, filed on Jan. 6, 2000, now Pat. No. 7,257,714, and a continuation-in-part of application No. 11/624,667, filed on Jan. 18, 2007, now abandoned, and a continuation-in-part of application No. 11/040,326, filed on Jan. 20, 2005, now abandoned.

(51) Int. Cl.
*G06F 1/00* (2006.01)
(52) U.S. Cl. .......................................................... 713/2
(58) Field of Classification Search ..................... 713/2
See application file for complete search history.

(56) References Cited

U.S. PATENT DOCUMENTS

| | | | |
|---|---|---|---|
| 6,636,929 B1 | 10/2003 | Frantz et al. | |
| 6,880,024 B2 | 4/2005 | Chen et al. | |
| 2002/0078338 A1* | 6/2002 | Lay et al. | 713/2 |
| 2004/0073727 A1 | 4/2004 | Moran et al. | |
| 2004/0203296 A1* | 10/2004 | Moreton et al. | 439/894 |
| 2005/0005076 A1 | 1/2005 | Lasser | |
| 2005/0160213 A1 | 7/2005 | Chen | |
| 2005/0160223 A1* | 7/2005 | Chen et al. | 711/115 |
| 2005/0246243 A1 | 11/2005 | Adams et al. | |
| 2006/0065743 A1 | 3/2006 | Fruhauf | |
| 2006/0075174 A1 | 4/2006 | Vuong | |
| 2006/0106962 A1 | 5/2006 | Woodbridge et al. | |
| 2006/0161725 A1 | 7/2006 | Lee et al. | |
| 2006/0173980 A1* | 8/2006 | Kobayashi et al. | 709/222 |
| 2006/0236318 A1 | 10/2006 | Moran et al. | |
| 2007/0006150 A9 | 1/2007 | Walmsley | |
| 2007/0094489 A1 | 4/2007 | Ota et al. | |
| 2007/0113267 A1 | 5/2007 | Iwanski et al. | |

* cited by examiner

*Primary Examiner* — Thomas Lee
*Assistant Examiner* — Mohammed H Rehman
(74) *Attorney, Agent, or Firm* — Stuart T. Auvinen; gPatent LLC (57) ABSTRACT

A multi-partition Universal Serial Bus (USB) device has a flash memory with multiple partitions of storage. Some partitions are for different operating systems and store OS images. Another partition has a control program while a user partition stores user data and user configuration information. The control program can test the multi-partition USB device and instruct the host computer BIOS to mount a partition from its flash memory as a drive of the host computer. The host computer can then be rebooted. The OS image from the flash memory is loaded into main memory during rebooting, and the host computer executes a new operating system using the new OS image. The user can press buttons on the multi-partition USB device to select which OS to load, and to begin rebooting. Virus removal programs in the alternate OS can help recover from a virus in the primary OS.

17 Claims, 9 Drawing Sheets

PRIOR ART

MULTI-PARTITION USB DEVICE THAT RE-BOOTS A PC TO AN ALTERNATE OPERATING SYSTEM FOR VIRUS RECOVERY

RELATED APPLICATION

This application is a continuation-in-part (CIP) of the applications U.S. Ser. No. 11/624,667 which was filed on Jan. 18, 2007, and "Electronic Data Storage Medium with Fingerprint Verification Capability", U.S. Ser. No. 09/478,720, filed Jan. 6, 2000, and "Multiple Function Flash Memory System", U.S. Ser. No. 11/040,326, filed Jan. 20, 2005.

FIELD OF THE INVENTION

This invention relates to Universal Serial Bus (USB) devices, and more particularly to system recovery using a USB device with multiple partitions.

BACKGROUND OF THE INVENTION

The bane of a computer user's existence is the ubiquitous computer crash. Computers unexpectedly display unusual messages on the display, displays show unusual patterns or colors, and keyboards and mice freeze up, causing the computer user consternation and grief. Ultimately, the computer user can do no more than yell at the computer and press the reset or power button to reboot the computer. Unsaved data may be lost in addition to the time and aggravation.

While many computer crashes are caused by poorly-written computer code or "bugs", malware such as computer viruses, Trojan programs, adware, spyware, and other malicious programs can also cause crashes, and may even cause all data on the hard drive to be destroyed. Anti-virus and other security software can scan for such malware, but there is still the danger of newly-written viruses that do not match known viruses in a virus definitions database. These newly-minted viruses can destroy system files on several machines before the virus centers react to them with updated virus definitions.

Certain operating systems (OS), because of their popularity or hackers' hatred of the OS company, are particular targets of virus writers. Other operating systems have fewer viruses, perhaps because these OS's are open-source and perceived as more socially correct, or perhaps because these OS's are less widely used.

Figure 1:
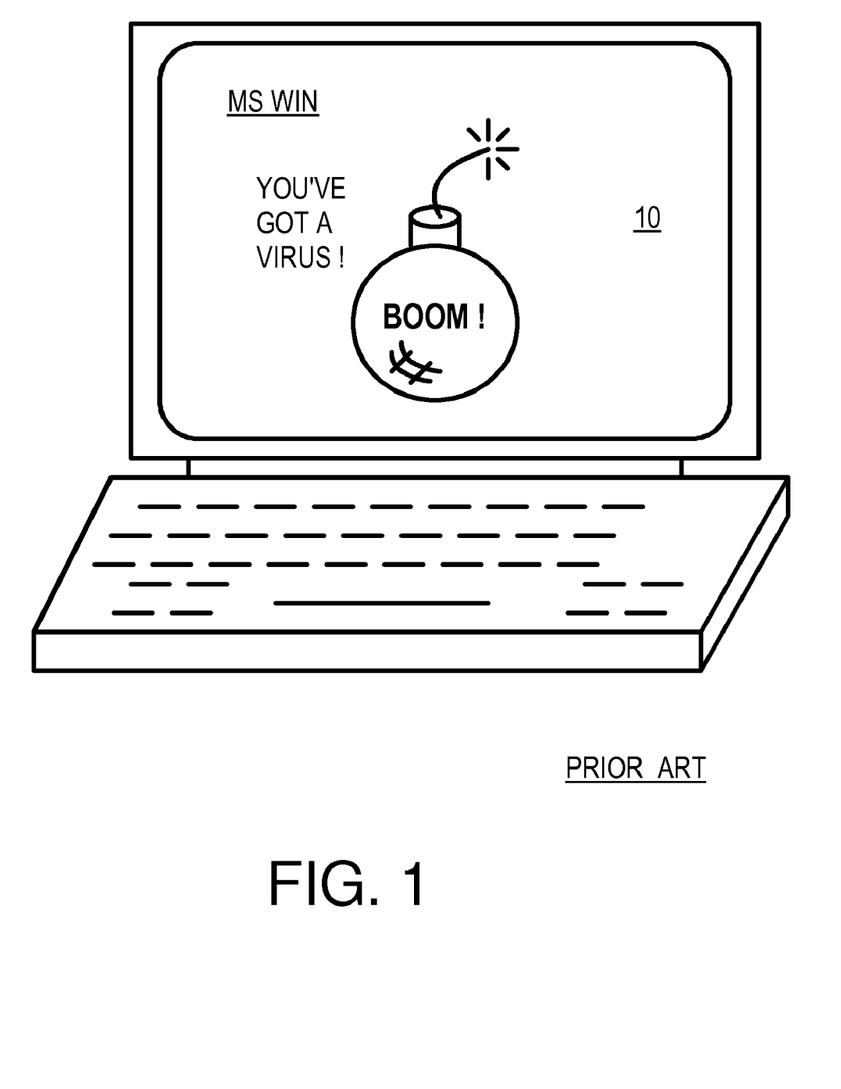
FIG. 1 shows a computer that has crashed due to a virus or other malware.

FIG. 1 shows a computer that has crashed due to a virus or other malware. Computer 10 was running a popular OS such as Microsoft's Windows. The user of computer 10 has contacted a new virus, perhaps by downloading an email attachment with a virus, or from a questionable web site. The virus is not in the user's virus definitions database, perhaps because the user has not updated his virus definitions for some time, or perhaps because the virus is new, or perhaps because the user does not use anti-virus software. This virus is malicious, displaying a provocative message on the computer screen, and perhaps damaging or destroying the user's data files, or sending confidential data to a criminal party.

When the user sees that a virus has attacked his computer, the user can reboot or restart his computer, but that may simply allow the malware more time to attack his computer and delete more user files. The user could try to update his virus definitions database, but the virus may prevent this update, and more damage may be done before the update is completed and the anti-virus program can be run to wipe out the virus.

Small portable Universal Serial Bus (USB) devices with flash memory are widely used to store data files. A USB device may be used to regularly back up data from computer 10. Some USB devices may allow the user to run programs or play music or audio files. These USB devices may themselves carry viruses to computer 10.

What is desired is a USB device that can allow recovery from a computer crash or virus. A USB device that has multiple partitions with different operating systems is desirable for use in virus recovery.

DETAILED DESCRIPTION

The present invention relates to an improvement in USB devices. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 2:
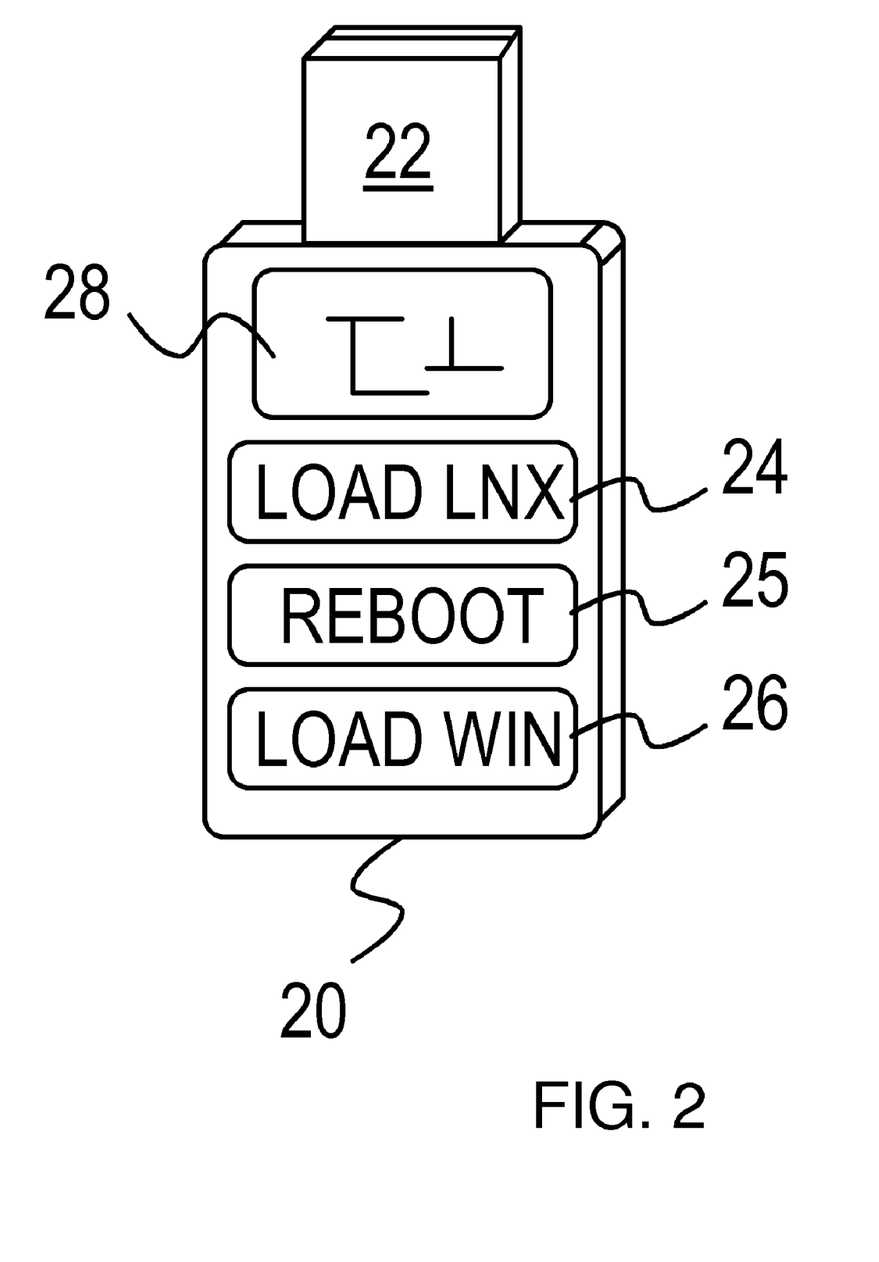
FIG. 2 shows a multi-partition USB device.

FIG. 2 shows a multi-partition USB device. USB device 20 includes USB connector 22 that fits into a standard USB socket on the user's computer. USB device 20 contains a memory such as a flash or phase-change memory that has multiple partitions that store OS images for at least 2 operating systems.

USB device 20 has several buttons that the user can press to perform various actions. Linux button 24 is pressed to load a Linux OS image into the computer that USB device 20 is plugged into. Windows button 26 is pressed to load Microsoft Windows OS into the computer that USB device 20 is plugged into. Reboot button 25 is pressed to reboot the computer that USB device 20 is plugged into. Rebooting causes the loaded OS image to be installed and activated. Switching operating systems is thus possible with USB device 20.

Display 28 can be a small display such as a liquid-crystal display (LCD) or an array of light-emitting diodes (LED) that display the loading and rebooting status to the user.

Figure 3:
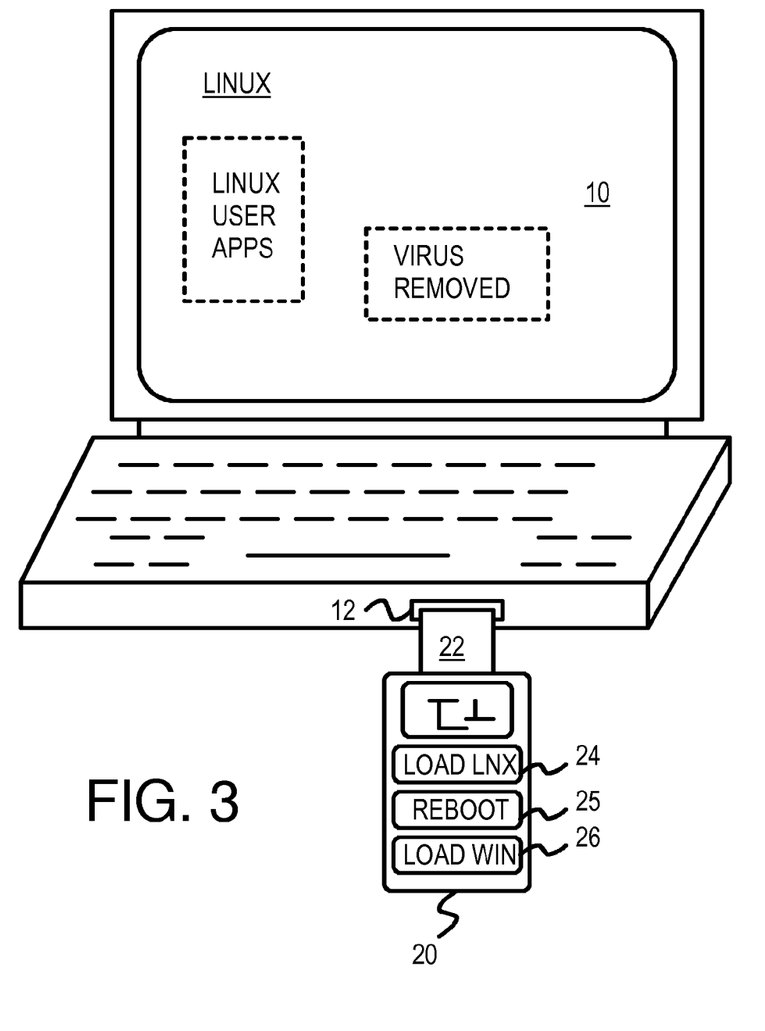
FIG. 3 shows a computer booted to an alternate operating system using a multi-partition USB device.

FIG. 3 shows a computer booted to an alternate operating system using a multi-partition USB device. The user may have contacted a virus while running Microsoft Windows, and the user quickly inserted USB device 20 into a USB socket on computer 10 and loaded Linux and rebooted by pressing buttons 24, 25.

The Linux OS image stored in the flash memory inside USB device 20 is copied to the main memory of computer 10. When the user presses reboot button 25 on USB device 20, then computer 10 reboots and activates the Linux OS. Since most viruses can only run under one operating system, the virus or malware cannot run under Linux. Further damage is prevented.

As computer 10 reboots and loads the Linux OS image that was copied from the flash memory of USB device 20, various Linux applications are initialized and begin running, perhaps displaying a window on the screen of computer 10. A Linux anti-virus program can also be activated. This Linux anti-virus program can scan for viruses in the data files within the Microsoft Windows area of the hard disk of computer 10, and detect and remove the new virus. A new virus definitions database can be downloaded.

Figure 4:
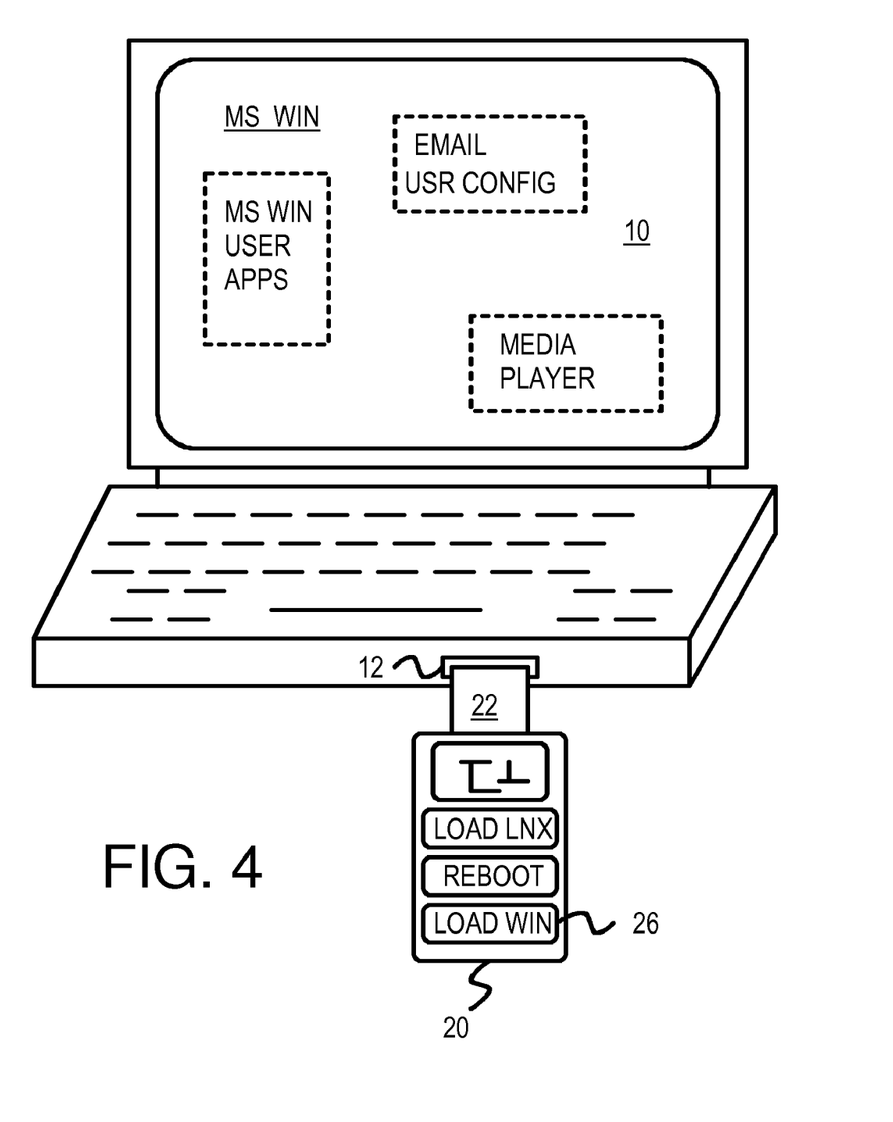
FIG. 4 shows a computer that has been rebooted with the Microsoft Windows operating system.

FIG. 4 shows a computer that has been rebooted with the Microsoft Windows operating system. Once the Microsoft Windows virus has been removed by the Linux anti-virus program, the user can safely switch back to Microsoft Windows.

Windows button 26 is pressed to load Microsoft Windows OS into the computer that USB device 20 is plugged into. Reboot button 25 is then pressed to reboot the computer that USB device 20 is plugged into. Rebooting causes the loaded OS image to be installed, activating Microsoft Windows.

Various windows programs are installed during rebooting, and other programs can be activated by the user once rebooting is finished. User programs may include a media player, and email program, and other Microsoft Windows applications such as a word processor and a spreadsheet. Device 20 may be removed from computer 20 once rebooting is complete.

Figure 5:
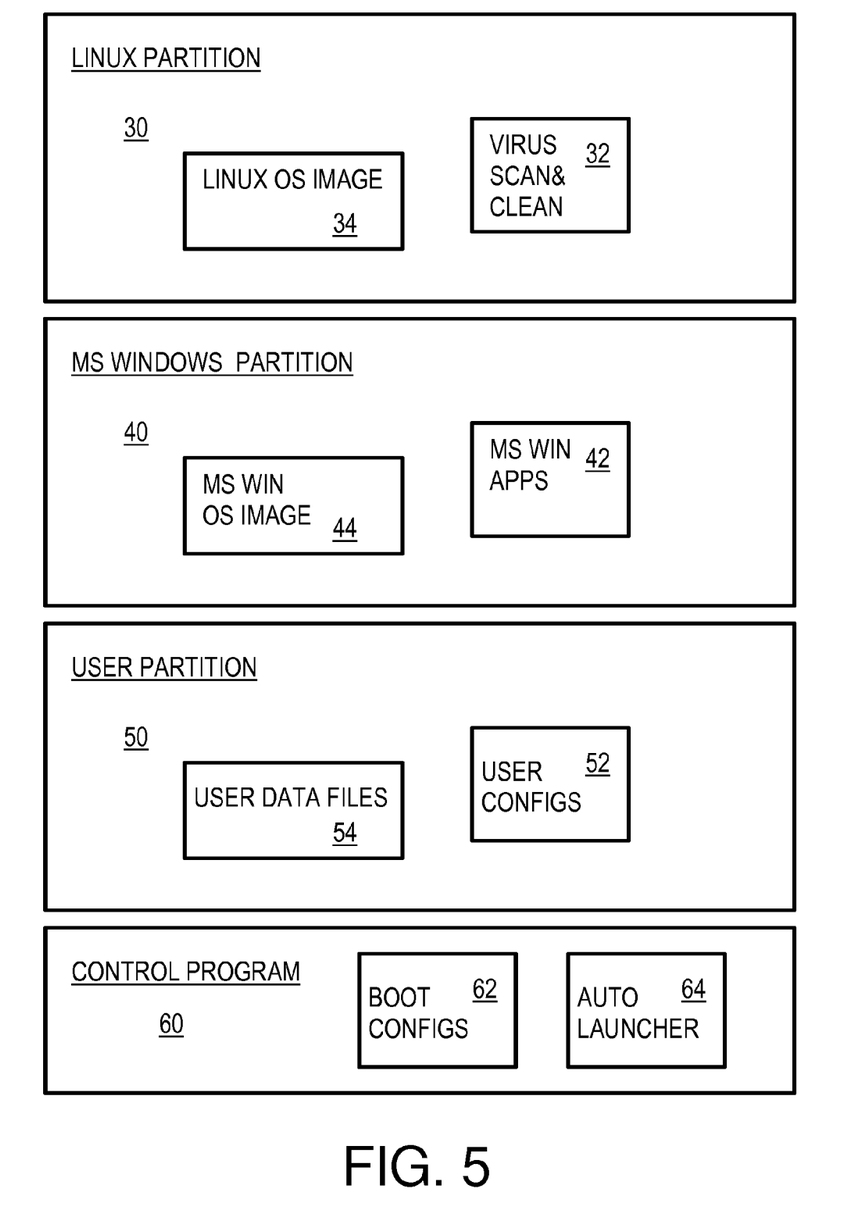
FIG. 5 shows partitions in flash memory inside a multi-partition USB device.

FIG. 5 shows partitions in flash memory inside a multi-partition USB device. Linux partition 30 stores Linux OS image 34, which includes the OS routines, definitions, modules, and drivers that are loaded into a computer's main memory just before running Linux. Linux-based user programs and data can also be stored in Linux partition 30, such as Linux anti-virus program 32 which can scan for and clean viruses and other malware.

Microsoft Windows partition 40 includes Microsoft Windows OS image 44, which includes the OS routines, definitions, modules, applications-programming-interface (API) interpreters, and drivers that are loaded into a computer's main memory just before running Microsoft Windows. Microsoft Windows based user programs and related data can also be stored in Microsoft Windows partition 40, such as Microsoft Windows applications 42.

User partition 50 stores use data files 54 which may be accessed by any operating system when each OS has a corresponding driver or program that can open files of that filetype. User configurations 52 can include configuration data that may be specific to one operating system or another, or may include generic configuration information.

Control program 60 is a partition of flash memory in the USB device that stores a control program and related data that is executed by the USB device itself. The USB device then notifies the host computer of the presence of a bootable device desiring to auto-launch an application. The host computer may then transfer control to the bootable device for execution. Boot configurations 62 contains configuration data about the partitions stored in the flash memory of the USB device, such as the association of partitions 30, 40 with buttons 24, 25, 26 on USB device 20 (FIG. 2), and which partition's data to transfer to computer 20 and what action or program to run when each of buttons 24, 25, 26 is pressed.

Auto-launcher 64 is a program that helps copy data from one of partitions 30, 40 to computer 10 when USB device 20 is inserted into computer 10 and recognized by the OS that is running on computer 10. Auto-launcher 64 may be a Launch Pad application that check the data type and brings up a list or menu of application software that end users can click on to activate their favorite application software for further action. For example, if the data is MP3 type, then auto-launcher 64 brings up a list of Media player or decoder software for end users to click and choose.

Figure 6:
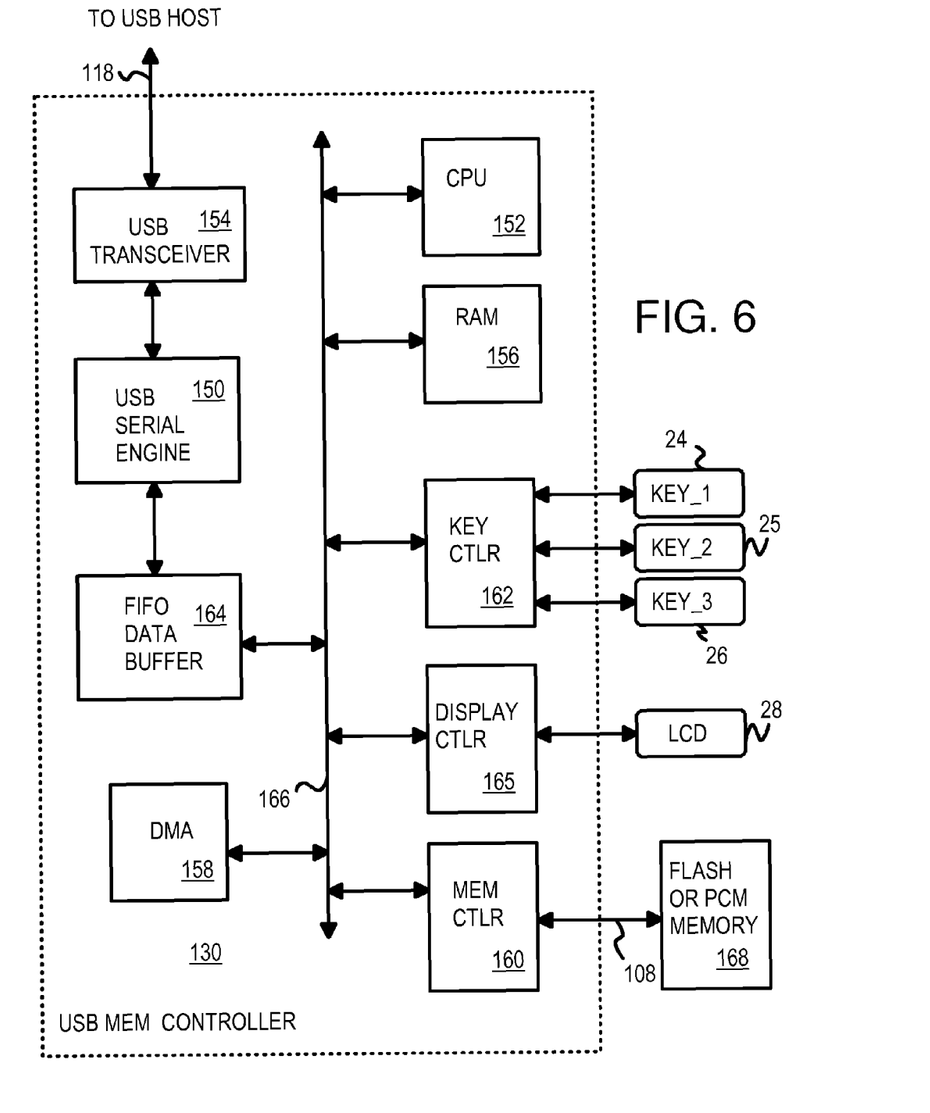
FIG. 6 is a block diagram of a USB micro-controller inside a USB device.

FIG. 6 is a block diagram of a USB micro-controller inside a USB device. The USB device can have an array of flash or PCM memory chips, or just one memory chip that form mass-storage 168.

Internal bus 166 connects CPU 152 with RAM 156, serial-data buffer 164, DMA engine 158, and memory controller 160. CPU 152 executes instructions from RAM 156, while DMA engine 158 can be programmed to transfer data between serial-data buffer 164 and memory controller 160. CPU 152 can operate on or modify the data by reading the data over bus 166. RAM 156 can store instructions for execution by the CPU and data operated on by the CPU.

Serial transceiver 154 connects to the differential data lines D+, D− of USB bus 118 and contains both a differential receiver and a differential transmitter. Data is encoded or decoded using NRZI encoding. Bit stuffing can be used to align data. An interrupt to CPU 152 can be generated when a start-of-packet sequence is detected on USB bus 118. CPU 152 can then execute a routine to handle the interrupt and process the new packet.

Serial engine 150 can perform higher-level functions such as checking cyclical-redundancy-check (CRC) checksums, locating packet identifiers, end-of-packet markers, higher-level frame markers, and converting serial data to parallel data words. The transmit and receive data is stored in serial-data buffer 164. Commands and addresses from the USB packets can also be stored in serial-data buffer 164, but is read by CPU 152 to determine what operation to perform rather than being sent directly to memory controller 160.

Memory controller 160 may include a data buffer, which contains the commands, addresses, and data sent over bus 108 to external mass storage devices. DMA engine 158 can be programmed by CPU 152 to transfer a block of data between memory controller 160 and serial-data buffer 164.

Display controller 165 drives display data to display 28. Display controller 165 may require external devices to step up signals to voltages required by display 28, and may have a display buffer of the display data that is updated by programs running on CPU 152.

Key controller 162 scans buttons 24, 25, 26 to detect when one of buttons 24, 25, 26 is pressed or released. De-bounce routines may be performed by key controller 162 to prevent multiple detections when a button is pressed. CPU 152 can be interrupted when a button is pressed or released, or CPU 152 may periodically poll key controller 162 to read the button status.

Figure 7A:
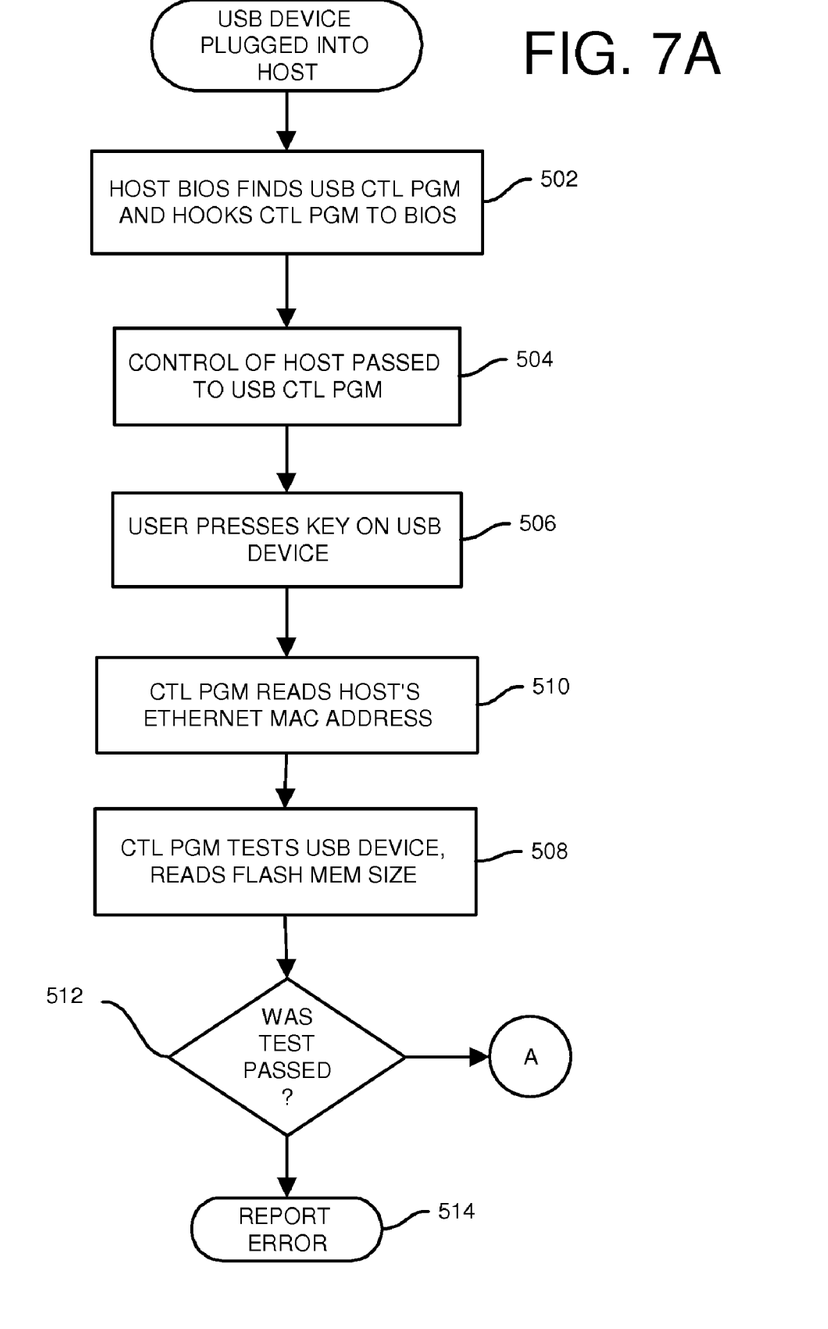
FIGS. 7A-B is a flowchart of switching operating systems using a multi-partition USB device.
Figure 7B:
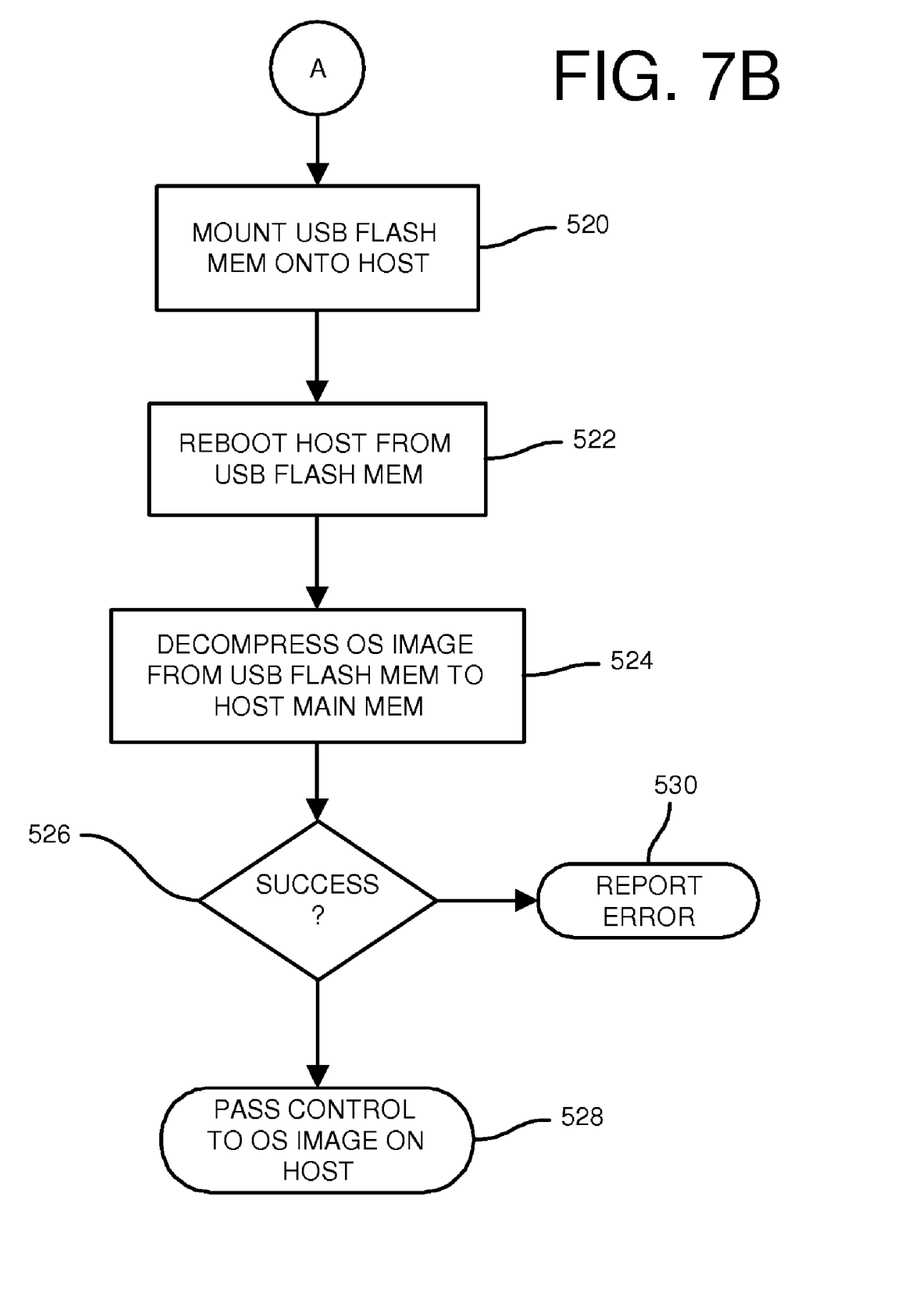

FIGS. 7A-B is a flowchart of switching operating systems using a multi-partition USB device. The user plugs the multi-partition USB device into a USB socket on the host computer. The basic input-output system (BIOS) of the current OS detects the insertion of the USB device, locates the control program in the flash memory of the USB device, and hooks the control program to the BIOS, step 502. The host computer passes control to the control program on the USB device, step 504, and the control program begins executing instructions. When the user presses one of the buttons on the USB device, step 506, then the control program running on the USB device performs the requested action, such as to load the alternate OS into the host computer. The control program reads and stores the host's Ethernet media-access-controller (MAC) address, step 510. This MAC address is passed to the new operating system to allow it to access the Internet after rebooting in the new OS.

The control program tests the USB device and reads the size of the flash memory, step 508. When the test fails, step 512, then the USB device is not functioning properly and should not be used to load a new OS into the host computer. An error report is generated, step 514, such as by displaying an error message on the display on the USB device to the user. A log file may also be written to, or a message may be sent to the host computer for display to the user.

When the test passes, step 512, the USB device is operating correctly. In FIG. 7B, the flash memory inside the USB device is mounted to the host computer's file system as another drive, step 520. The USB flash memory can now be accessed by the host computer.

The host computer can be configured to boot from this USB flash memory, rather than from the host computer's hard disk. A flag or other setting in the host computer may be set to indicate which drive to boot from, or a boot order or list may specify to check the flash memory for an OS image when booting.

When the user presses the reboot button on the USB device, the host is instructed to reboot, step 522. The host computer's BIOS finds the OS image on the flash memory that was mounted from USB device. This OS image is decompressed if it was compressed, and copied from the USB flash memory to the main memory of the host computer, step 524.

A checksum at the end of the OS image may be verified to determine whether the OS image was successfully transferred, step 526, or some other verification method may be used. After one or more attempts, when the OS cannot be successfully transferred, an error is reported, step 530. The host computer may reboot using another OS image, such as from its hard disk.

When the OS image was successfully copied from the USB flash memory to the host computer's main memory, step 526, then the host can transfer control to the copied OS image, step 528. The OS image can then load application and other programs for execution.

The host computer can switch over to an alternate operating system using this method. The USB device can detect a button press from the user to load one operating system, and the control program in the USB device can then make this operating system's partition visible to the host computer, and hide the other operating system's partition from the host computer. The user partition may be made available once booting is complete.

More details of using multiple partitions in a USB device can be found in the parent application, "Multiple Function Flash Memory System", U.S. Ser. No. 11/040,326, filed Jan. 20, 2005.

Figure 8:
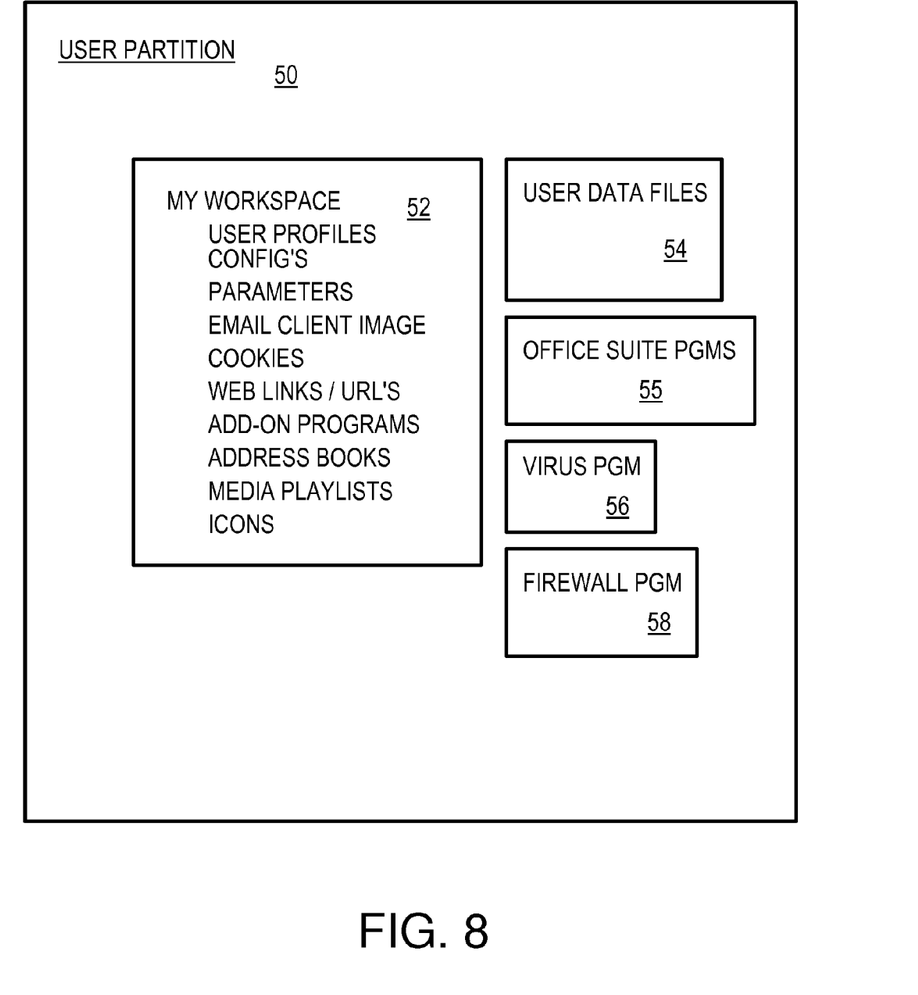
FIG. 8 shows the user partition on the multi-partition USB device in more detail.

FIG. 8 shows the user partition on the multi-partition USB device in more detail. User partition 50 stores user data files 54 which may be accessible in one or both operating systems, depending on applications available in the operating systems. Office suite programs 55 can contain Microsoft Windows office software such as word processing, spreadsheet, contact, and scheduling software, or office suite software for Linux or another operating system. Virus program 56 can detect and remove viruses while running on Linux. Firewall program 58 protects the user's computer from external attacks when connected to a network such as the Internet.

User configurations 52 can include a wide variety of user configuration data for one or for both operating systems. User profiles or workspaces stored in user configurations 52 may include parameters, email client images, web cookies, links, and universal resource locators (URL's), web browser add-on programs, address books, media playlists and settings, icons, and other user-specific data.

Alternate Embodiments

Several other embodiments are contemplated by the inventors. For example while flash memory inside USB device 20 has been described, other kinds of memory may be used inside USB device 20, such as phase-change memory (PCM), or combinations of DRAM, SRAM, flash, ROM, EEPROM, MRAM, STT-RAM, and PCM.

Some of the block-level functions of the mass storage device could be incorporated into higher-level controllers, or into the lower-level memory chips. Rather than sending a whole block over to memory chips using DMA, a series of words could be sent to the memory chips from the FIFO or other buffer on the controller chip. Various levels of address translation could be included, such as bad-block or wear-leveling re-mapping, or address caching for improving access speed. Rather than having one or two channels, four, eight, or more channels could be supported.

While a personal computer (PC) host has been described, other kinds of computers could benefit from using PCM peripherals. For example, laptop, Apple Mac's, Linux, Unix, and other kinds of computers, and portable devices, such as an ultra-mobile personal computer, mobile Internet devices, personal digital assistants (PDAs), MP3 (or portable Media Player/MPEG-4), VoIP handsets, smart phones, cell phone handsets, gaming devices, and game consoles could be the computer that uses the invention. The PCM peripherals could be designed for backward compatibility with older legacy computers.

Phase-change memory may use PCM cells with select transistors in series with the variable resistor, or additional transistors may be added, such as for a dual-port memory with 2 bit lines per cell, and two select transistors that connect to the same alloy resistor. The melting and crystalline temperatures may vary with the alloy composition and with other factors such as impurities. The shape and size of the alloy resistor may also affect these temperatures and set, reset time periods.

The terms set and reset can be applied to either binary logic state. For example, set can refer to changing to the logic 1 state for positive logic, or to changing to the logic 0 state for negative or inverse logic. Likewise, reset is to 0 for positive logic, but inverted logic can reset to 1, such as for active-low logic. One system can use both active-high and active-low logic domains, and logic can refer to the physical states of the memory cells, or the data read at the I/O of a memory chip, or at some other point.

Directional terms such as upper, lower, up, down, top, bottom, etc. are relative and changeable as devices are rotated, flipped over, etc. These terms are useful for describing the device but are not intended to be absolutes. Some embodiments may have chips or other components mounted on only one side of a circuit board, while other embodiments may have components mounted on both sides.

Rather than use USB buses, other serial buses may be used such as PCI Express, ExpressCard, Firewire (IEEE 1394), serial ATA, serial attached small-computer system interface (SCSI), etc. When PCI Express is used, additional pins for the PCI Express interface can be added or substituted for the USB differential data pins. PCI express pins include a transmit differential pair PET+, PET−, and a receive differential pair PER+, PER− of data pins. A multi-bus-protocol chip could have an additional personality pin to select which serial-bus interface to use, or could have programmable registers. ExpressCard has both the USB and the PCI Express bus, so either or both buses could be present on an ExpressCard device.

The controller components such as the serial engine, DMA, PCM memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

A standard flash, DRAM, or SRAM controller may be integrated with the USB controller to allow for accessing these various kinds of memories. Various routines may contain instructions that are part of the operating system, basic input-output system (BIOS), manufacturer-specific routines, and higher-level application programs, and various combinations thereof. Various modified bus architectures may be used. Buses such as the local bus may have several segments isolated by buffers or other chips.

The phase-change memory may have cells that each store one binary bit of data, or multi-level cells may be defined for different values of resistance of the alloy resistor. Memory partitions may be logical rather than being physical portions of the memory.

Rather than have 3 buttons 24, 25, 26 as shown, the multi-partition USB device may have fewer buttons, or a selectable menu on the display that functions to select the operating systems. The display may be reduced to just a few indicators or may be more sophisticated.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method to switch operating systems comprising:

detecting when a user inserts a multi-partition Universal Serial Bus (USB) device into a USB socket on a host computer when the host computer is executing a primary operating system;

executing a basic input-output system (BIOS) on the host computer when the multi-partition USB device is inserted and linking a control program stored on the multi-partition USB device to the BIOS;

passing control to and executing the control program on the multi-partition USB device;

testing the multi-partition USB device and determining a memory size of a USB memory on the multi-partition USB device by executing the control program;

mounting the USB memory on a file system of the host computer when testing passes;

rebooting the host computer from the multi-partition USB device;

copying an alternate OS image from an alternate-OS partition of the USB memory to a main memory of the host computer;

passing control to the alternate OS image copied to the main memory and executing application programs in an alternate operating system using the alternate OS image; and detecting a button press by the user of a button on the multi-partition USB device, wherein the button press indicates a request to switch the host computer to the alternate operating system;

wherein the button press selects the alternate-OS partition or a primary-OS partition to mount to the file system;

wherein the button press selects among the alternate operating system and the primary operating system for loading during rebooting;

wherein mounting the USB memory on a file system of the host computer when testing passes comprises mounting the alternate-OS partition to the file system when a button for the alternate operating system is pressed, and comprises mounting the primary-OS partition to the file system when a button for the primary operating system is pressed, whereby buttons select an operating system and whereby the host computer is rebooted from the multi-partition USB device to load the alternate operating system.

2. The computer-implemented method of claim 1 further comprising:

decompressing the alternate OS image when copying the alternate OS image from the alternate-OS partition of the USB memory to the main memory of the host computer, whereby compressed OS images are decompressed.

3. The computer-implemented method of claim 1 further comprising:

waiting for the user to press a reboot button on the multi-partition USB device before rebooting the host computer from the multi-partition USB device.

4. The computer-implemented method of claim 1 further comprising:
  reading an Ethernet media-access-controller (MAC) address from the host computer before rebooting and storing the Ethernet MAC address on the multi-partition USB device;
  sending the Ethernet MAC address from the multi-partition USB device to the host computer after copying the alternate OS image from the alternate-OS partition of the USB memory to the main memory of the host computer;
  whereby the Ethernet MAC address is captured by the multi-partition USB device before rebooting.

5. A computer-implemented method to switch operating systems comprising:
  detecting when a user inserts a multi-partition Universal Serial Bus (USB) device into a USB socket on a host computer when the host computer is executing a primary operating system;
  executing a basic input-output system (BIOS) on the host computer when the multi-partition USB device is inserted and linking a control program stored on the multi-partition USB device to the BIOS;
  passing control to and executing the control program on the multi-partition USB device;
  testing the multi-partition USB device and determining a memory size of a USB memory on the multi-partition USB device by executing the control program;
  mounting the USB memory on a file system of the host computer when testing passes;
  rebooting the host computer from the multi-partition USB device;
  copying an alternate OS image from an alternate-OS partition of the USB memory to a main memory of the host computer;
  passing control to the alternate OS image copied to the main memory and executing application programs in an alternate operating system using the alternate OS image; and
  executing a virus scanning and removal program on the alternate operating system to remove malware from the host computer;
  wherein the malware executes using the primary operating system and is not executable using the alternate operating system;
  whereby the host computer is rebooted from the multi-partition USB device to load the alternate operating system and whereby malware is removed using the virus scanning and removal program that executes on the alternate operating system.

6. The computer-implemented method of claim 5 wherein the alternate operating system is a Linux operating system and the primary operating system is a Microsoft Windows operating system.

7. A multi-partition memory peripheral comprising:
  a central processing unit (CPU) for executing instructions;
  a random-access memory (RAM) for storing instructions for execution by the CPU;
  a bus transceiver for receiving peripheral commands and data from a host over a host bus;
  a memory controller coupled to the CPU;
  a mass-storage device, coupled to the memory controller, for storing non-volatile data for the host, the data in the mass-storage device being block-addressable and not randomly-addressable;
  a primary operating system partition of the mass-storage device that stores a primary operating system image for execution by the host when executing application programs under a primary operating system;
  an alternate operating system partition of the mass-storage device that stores an alternate operating system image for execution by the host when executing application programs under an alternate operating system;
  a control program partition of the mass-storage device that stores a control program that controls loading of a selected operating system image to the host;
  a selector for selecting the selected operating system image, wherein the selected operating system image is selected from the primary operating system image and the alternate operating system image; and
  a memory bus having data lines for transferring data from the memory controller to the mass-storage device.

8. The multi-partition memory peripheral of claim 7 wherein the selector further comprises:
  a first button pres sable by a user to select the alternate operating system image as a selected operating system image;
  key controller means, coupled to the CPU, for detecting when the first button is pressed, and for instructing the CPU to activate the control program to mount the alternate operating system partition to the host and to not mount the primary operating system partition to the host,
  whereby the first button selects mounting of the alternate operating system partition.

9. The multi-partition memory peripheral of claim 8 further comprising:
  a second button pres sable by the user to select the primary operating system image as the selected operating system image;
  wherein the key controller means further comprises second means for detecting when the second button is pressed, and for instructing the CPU to activate the control program to mount the primary operating system partition to the host and to not mount the alternate operating system partition to the host,
  whereby the second button selects mounting of the primary operating system partition.

10. The multi-partition memory peripheral of claim 9 further comprising:
  a third button pressable by the user to select reboot the host;
  wherein the key controller means further comprises third means for detecting when the third button is pressed, for instructing the CPU to activate the control program to reboot the host, and to copy the selected operating system image to the host during rebooting,
  whereby the third button reboots the host.

11. The multi-partition memory peripheral of claim 7 further comprising:
  a user partition of the mass-storage device that stores user data files that are readable by application programs running under the primary operating system.

12. The multi-partition memory peripheral of claim 7 further comprising:
  a direct-memory access (DMA) engine for transferring data among the memory controller, the RAM, and the bus transceiver, the DMA engine being programmed for a transfer.

13. The multi-partition memory peripheral of claim 12 further comprising:
  an internal bus, the internal bus connecting to the CPU, to the RAM, to a buffer for the bus transceiver, and to the memory controller;

wherein the instructions executed by the CPU are transferred from the mass-storage device over the memory bus to the memory controller and then to the internal bus for storage by the RAM.

14. The multi-partition memory peripheral of claim 7 wherein the bus transceiver connects to the host bus which is a Multi-Media Card/Secure Digital (MMC/SD) bus, an integrated device electronics (IDE) bus, an AT-Attachment (ATA) bus, a CompactFlash (CF) bus, a Memory Stick (MS) interface bus, a Serial AT-attachment (SATA) bus, a Small Computer System Interface (SCSI) bus, a PCI-Express (PCIe) interface bus, or a Universal Serial Bus (USB) interface bus.

15. A multi-partition Universal Serial Bus (USB) device comprising:

host interface means for connecting to a host over a host bus that is a Universal Serial Bus (USB);

processor memory means for storing instructions for execution;

processor means for executing instructions from the processor memory means;

USB memory means for storing multiple partitions of data;

internal bus means for transferring instructions and data between the host interface means, the processor means, the processor memory means, and the USB memory means;

primary operating system partition means, in the USB memory means, for storing a primary operating system image for execution by the host when executing application programs under a primary operating system;

alternate operating system partition means, in the USB memory means, for storing an alternate operating system image for execution by the host when executing application programs under an alternate operating system;

control program partition means, in the USB memory means, for storing a control program that controls loading of a selected operating system image to the host;

select means for selecting the selected operating system image, wherein the selected operating system image is selected from the primary operating system image and the alternate operating system image in response to user input processed by the processor means; and direct-memory access (DMA) engine means for directly transferring data and instructions over the internal bus means among the host interface means, the USB memory means, and the processor means.

16. The multi-partition Universal Serial Bus (USB) device of claim 15 wherein the host interface means comprises:

host transceiver means for receiving clocked data and commands from the host bus, and for driving data onto the host bus in response to a command;

host operating register means for storing data and commands in a format specified by a host protocol specification; and command decoder and validator means, coupled to the host operating register means, for decoding and validating a command received over the host bus by the host transceiver means.

17. The multi-partition Universal Serial Bus (USB) device of claim 16 wherein the select means further comprises:

first button means for pressing by a user to select the alternate operating system image as a selected operating system image;

key controller means, coupled to the processor means, for detecting when the first button means is pressed, and for instructing the processor means to activate the control program to mount the alternate operating system partition means to the host and to not mount the primary operating system partition means to the host, whereby the first button means selects mounting of the alternate operating system partition.

* * * * *